United States Patent

Hattori

[11] Patent Number: 5,924,055
[45] Date of Patent: Jul. 13, 1999

[54] VEHICLE TIRE AIR PRESSURE MONITOR

[75] Inventor: Yutaka Hattori, Hiratsuka, Japan

[73] Assignee: The Yokohama Rubber Co., Ltd., Tokyo, Japan

[21] Appl. No.: 08/669,314

[22] PCT Filed: Nov. 14, 1995

[86] PCT No.: PCT/JP95/02324

§ 371 Date: Sep. 16, 1996

§ 102(e) Date: Sep. 16, 1996

[87] PCT Pub. No.: WO96/15003

PCT Pub. Date: May 23, 1996

[30] Foreign Application Priority Data

Nov. 14, 1994 [JP] Japan .................................... 6-278943

[51] Int. Cl.[6] .................................................. B60C 23/02
[52] U.S. Cl. .......................... 702/138; 340/447; 73/146.5
[58] Field of Search ........................... 364/558; 340/442, 340/447, 443, 825.54; 73/146.3–146.5; 702/138

[56] References Cited

U.S. PATENT DOCUMENTS 5,463,374  10/1995  Mendez et al. .......................... 340/442
5,602,524   2/1997  Mock et al. ............................. 340/447
5,604,482   2/1997  Majeed et al. .......................... 340/442

Primary Examiner—Kamini Shah
Attorney, Agent, or Firm—Nikaido, Marmelstein, Murray & Oram LLP

[57] ABSTRACT

To provide a tire air pressure monitor of a vehicle having four or six wheel assemblies, making it possible to easily check the air pressure of a tire. A sensor 1 for detecting the air pressure of a tire is provided at the wheel assembly side, a detection unit 2 is provided at the chassis side for each sensor 1 so as to face the sensor 1, and a monitoring unit 3 is provided at a position which can be seen from a driver's seat. A detection result by the sensor 1 is acquired by a detection result acquisition means 21, and the detection result is converted to digital data by a data generation section 22 and moreover, provided with an ID code different for each detection unit 2 and transmitted by a transmission section 23 through AM waves by using radio waves of a predetermined frequency. The radio waves are received by a reception section 31 of a monitoring unit 3, a detection result of the air pressure of each tire is displayed by a CPU 32 through a display section 33 and an alarm section 34, and an alarm is output for emergency.

12 Claims, 15 Drawing Sheets

FIG.7(a) 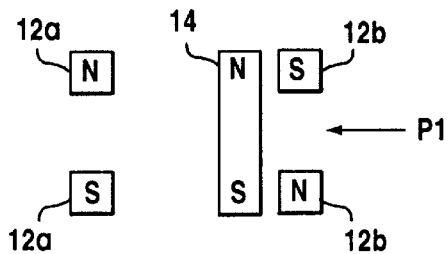 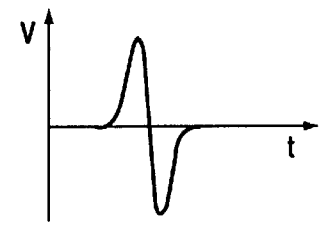
FIG.7(b) 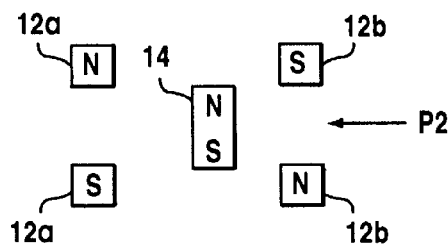 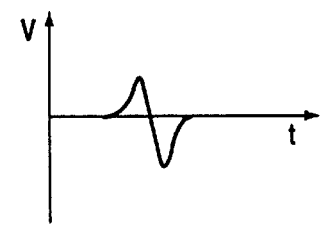
FIG.7(c) 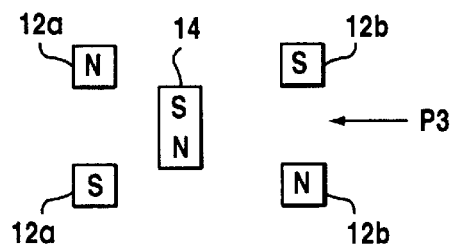 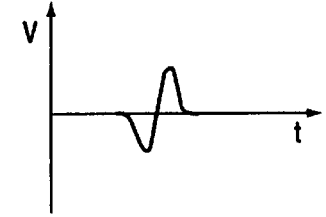
FIG.7(d) 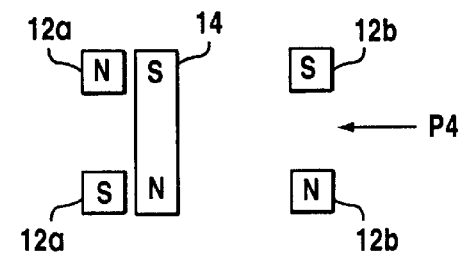 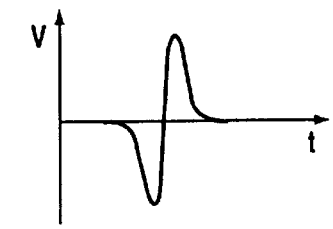

| PHASE | LEVEL | DETECTED VALUE |
|---|---|---|
| + | 4 | 7 |
| | 3 | 6 |
| | 2 | 5 |
| | 1 | 4 |
| − | 1 | 3 |
| | 2 | 2 |
| | 3 | 1 |
| | 4 | 0 |

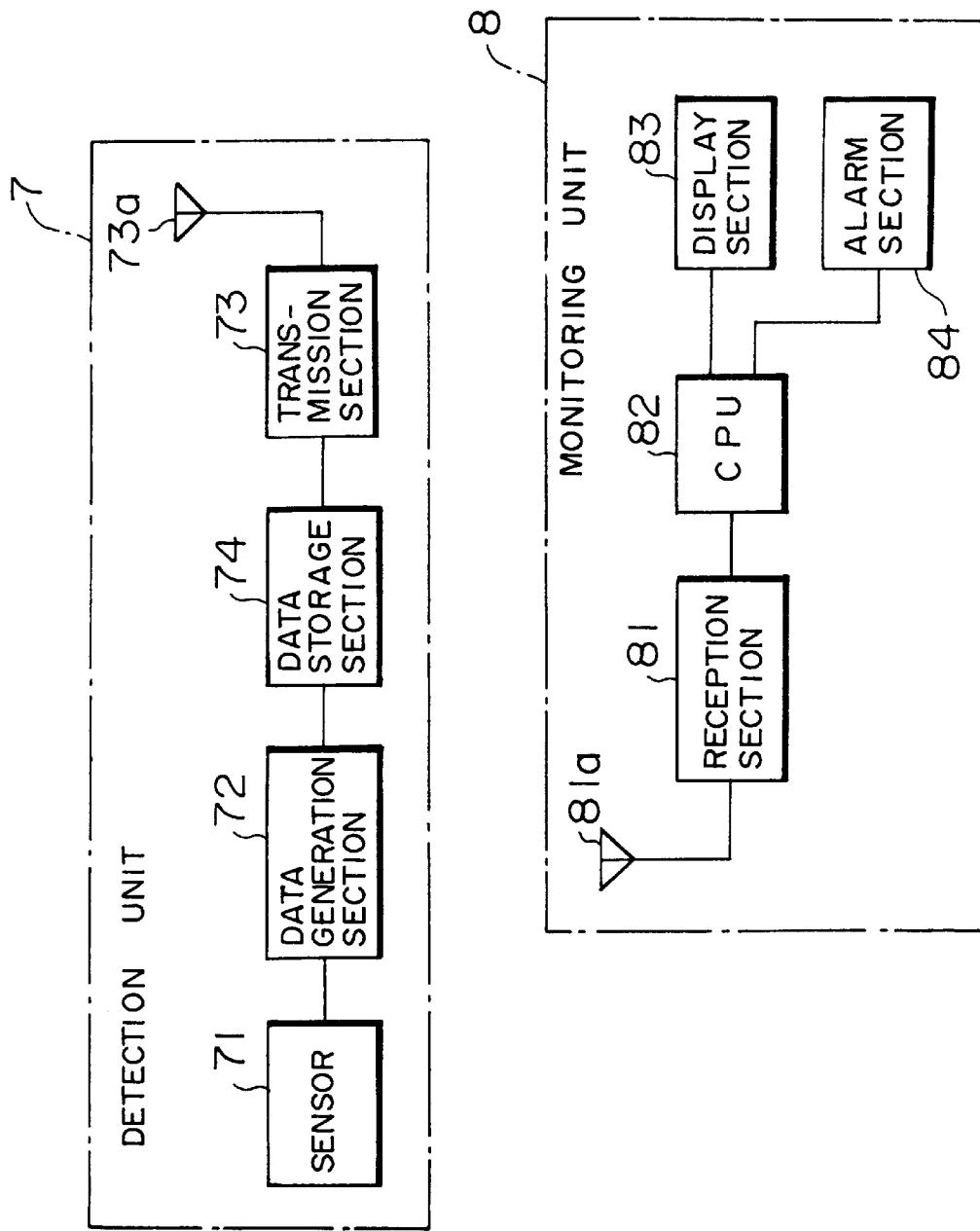

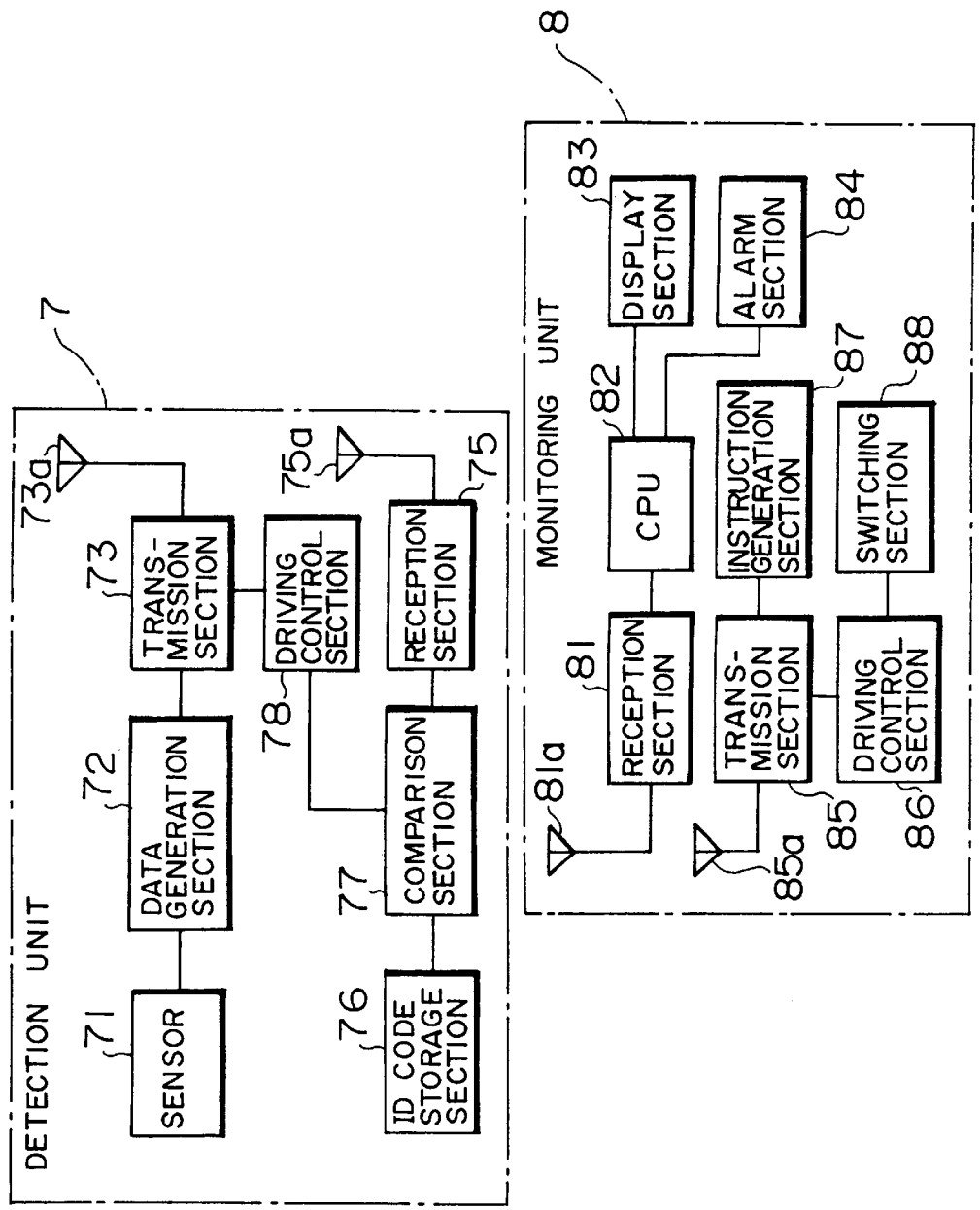

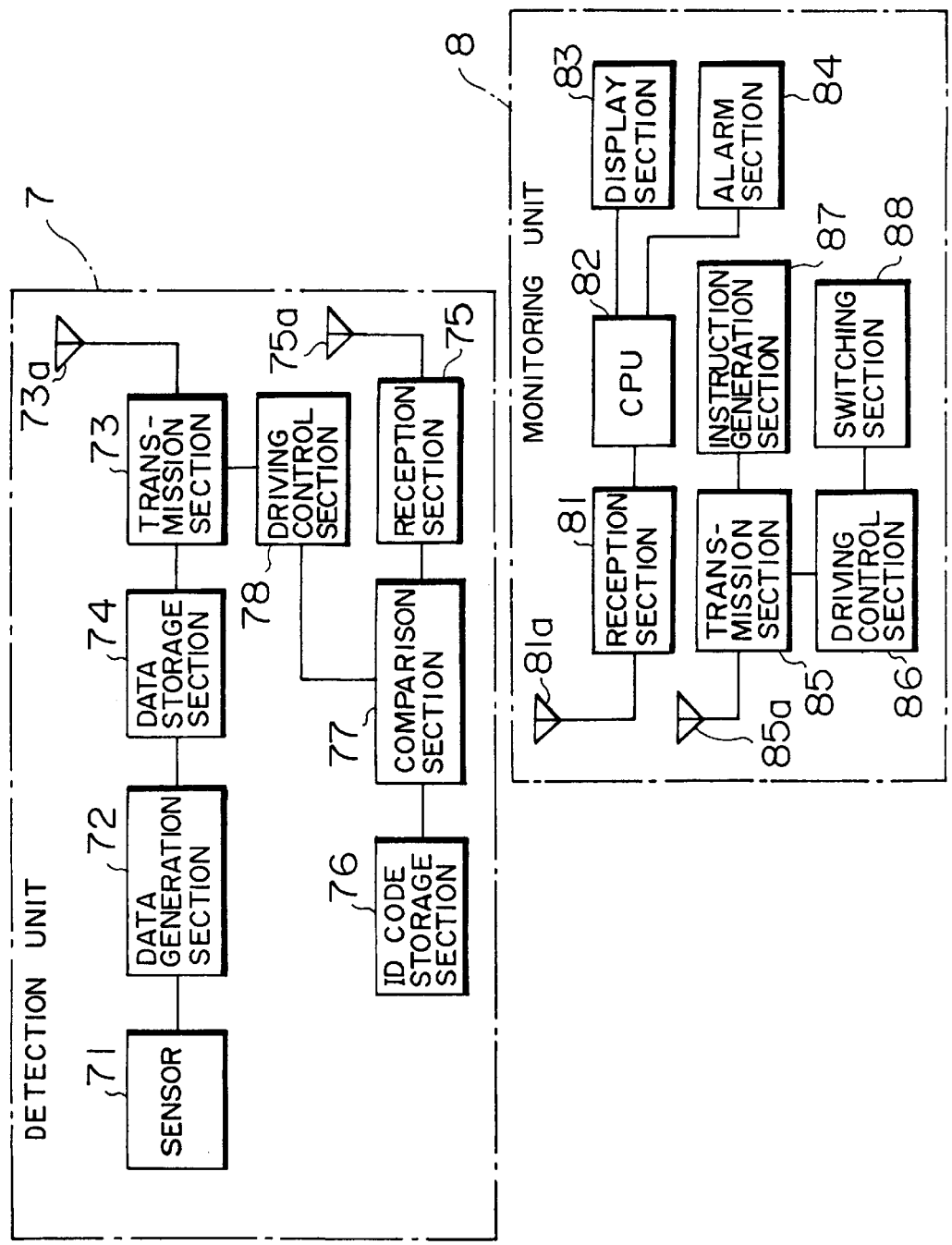

5,924,055

VEHICLE TIRE AIR PRESSURE MONITOR

TECHNICAL FIELD

The present invention relates to a vehicle tire air pressure monitor for monitoring the air pressure of a tire of a vehicle.

BACKGROUND ART

Conventionally, setting the air pressure of a tire of a vehicle to a proper state is one of the items which must be observed for safety traveling of the vehicle. For example, when the air pressure of a tire lowers, the blowout rate increases and a burst occurs in high-speed traveling of a vehicle and this may cause a serious accident.

Therefore, a driver must usually check the air pressure of a tire. To check the air pressure of a tire, the air pressure has been measured for each tire by pressing a pressure measuring instrument against a valve provided on the rim of a wheel.

However, it takes a lot of time to measure the air pressure of each tire as described above and moreover, measuring the air pressure is very difficult for female drivers who have suddenly been increased in recent years. Therefore, there is a problem that the number of accidents caused by an abnormal air pressure of a tire increases because a driver tends to neglect checking the air pressure of a tire though the driver must usually check the air pressure.

The present invention is made to solve the above problem and its object is to provide a monitor for the air pressure of a tire of a vehicle having a plurality of wheels such as four or six wheels, making it possible to easily check the air pressure of a tire.

DISCLOSURE OF THE INVENTION

According to claim 1 of the present invention, the air pressure of a tire is detected by air pressure detection means provided at the wheel side and the detection result is transmitted together with an ID code by radio waves of the same frequency from a plurality of detection sections provided correspondingly to each wheel. The radio waves are received by detection result reception means of a monitoring section and the detection result by the air pressure detection means is obtained for each tire in accordance with the ID code. Therefore, because radio waves with frequencies different for each tire are not used, the structure of equipment is simplified and the air pressure of a tire can very easily be measured. Thus, a female driver can also easily measure the air pressure. Thereby, a driver can usually check the air pressure of a tire and the number of accidents caused by an abnormal air pressure of a tire can be decreased. Moreover, because only the air pressure detection means is provided at the wheel side and the detection result transmission means and the like are provided at the chassis side, it is possible to relatively easily set these means. Furthermore, because detection results are transferred by radio waves, troublesome wiring is unnecessary for setting.

Furthermore, when a plurality of tires are used, because a detection result of the air pressure of a tire is transmitted together with an ID code different for each tire, it is possible to recognize the detection result for each tire even if detection results of these tires are transmitted at random by the detection result transmission means. Furthermore, because the detection result transmission means is provided not at the wheel side but at the chassis side, it is only necessary to set the air pressure detection means in a wheel when changing wheels but it is unnecessary to change ID codes or change locations of a transmission section.

According to claim 2, the air pressure of a tire is detected by air pressure detection means provided at the wheel side, the detection result is held for a predetermined time by storage means of a plurality of detection sections provided correspondingly to each wheel and thereafter, transmitted from each detection section by radio waves of the same frequency together with an ID code. The radio waves are received by detection result reception means of a monitoring section and the detection result by the air pressure detection means is obtained for each tire in accordance with the ID code. Therefore, because radio waves of frequencies different for each tire are not used, the structure of equipment is simplified and the air pressure of a tire can very easily be measured. Thus, a female driver can also easily measure the air pressure. Thereby, a driver can usually check the air pressure of a tire and it is possible to decrease the number of accidents caused by an abnormal air pressure of a tire. Moreover, because detection results are held by the storage means, it is possible to easily monitor the air pressure of a tire while a vehicle stops due to a stop signal even if air pressure detection means is used which cannot detect the air pressure of a tire unless a wheel rotates. Moreover, because only the air pressure detection means is provided at the wheel side and the detection result transmission means and the like are provided at the chassis side, it is possible to relatively easily set these means. Furthermore, because detection results are transferred by radio waves, troublesome wiring is unnecessary for setting.

Furthermore, when a plurality of tires are used, because a detection result of the air pressure of a tire is transmitted together with an ID code different for each tire, it is possible to recognize the detection result for each tire even if detection results of these tires are transmitted at random by the detection result transmission means. Furthermore, because the detection result transmission means is provided not at the wheel side but at the chassis side, it is only necessary to set the air pressure detection means in a wheel when changing wheels but it is unnecessary to change ID codes or change locations of a transmission section.

According to claim 3, a detection result of the air pressure of a tire detected by air pressure detection means provided at each wheel side is transmitted from a plurality of detection sections provided correspondingly to each wheel by radio waves of the same frequency together with an ID code only when a monitoring start instruction is output. The transmitted radio waves are received by detection result reception means of a monitoring section and a detection result is obtained for each tire in accordance with the ID code. Therefore, it is possible to very easily measure the air pressure of a tire and a female driver can also measure the air pressure. Thereby, a driver can usually check the air pressure of a tire and it is possible to decrease the number of accidents caused by an abnormal air pressure of a tire. Moreover, only when the monitoring start instruction is output, a detection result is transmitted. Therefore, it is possible to prevent unnecessary radio waves from being emitted when monitoring of the air pressure of a tire is unnecessary and decrease the power consumption. Furthermore, because only the air pressure detection means is provided at the wheel side and detection result transmission means is provided at the chassis side, it is possible to relatively easily set these means. Furthermore, because detection results are transferred by radio waves, troublesome wiring is unnecessary for setting.

According to claim 4, a detection result of the air pressure of a tire detected by air pressure detection means provided at each wheel side is transmitted from a plurality of detection sections provided correspondingly to each wheel by radio waves of the same frequency together with an ID code only when a monitoring start instruction is output. The transmitted radio waves are received by detection result reception means of a monitoring section and a detection result is obtained for each tire in accordance with the ID code. Therefore, it is possible to very easily measure the air pressure of a tire and a female driver can also measure the air pressure. Thereby, a driver can usually check the air pressure of a tire and it is possible to decrease the number of accidents caused by an abnormal air pressure of a tire. Moreover, only when the monitoring start instruction is output from the monitoring section, a detection result is transmitted. Therefore, it is possible to prevent unnecessary radio waves from being emitted when monitoring of the air pressure of a tire is unnecessary and decrease the power consumption. Moreover, because detection results are held by the storage means, it is possible to easily monitor the air pressure of a tire while a vehicle stops due to a stop signal even if air pressure detection means is used which cannot detect the air pressure of a tire unless a wheel rotates. Furthermore, because only the air pressure detection means is provided at the wheel side and the detection result transmission means and the like are provided at the chassis side, it is possible to relatively easily set these means. Furthermore, because detection results are transferred by radio waves, troublesome wiring is unnecessary for setting.

According to claim 5, the air pressure of a tire is detected by air pressure detection means of a detection section provided at each wheel side and the detection result is transmitted from a plurality of detection sections by radio waves of the same frequency together with an ID code. The radio waves are received by detection result reception means of a monitoring section and a detection result by the air pressure detection means is obtained for each tire in accordance with the ID code. Therefore, because radio waves of frequencies different for each tire are not used, the structure of equipment is simplified and the air pressure of a tire can very easily be measured. Thus, a female driver can also easily measure the air pressure. Thereby, a driver can usually check the air pressure of a tire and it is possible to decrease the number of accidents caused by an abnormal air pressure of a tire. Moreover, because detection results are transferred by radio waves, troublesome wiring is unnecessary for setting. Furthermore, an ID code different for each tire and a detection result of the air pressure of a tire are transmitted. Therefore, when a plurality of tires are used, it is possible to recognize the detection result for each tire even if the detection result of these tires are transmitted at random by the detection result transmission means.

According to claim 6, the air pressure of a tire is detected by air pressure detection means of a detection section provided at each wheel side and the detection result is held by storage means for a predetermined time and thereafter transmitted from a plurality of detection sections provided for each tire by radio waves of the same frequency together with an ID code. The radio waves are received by detection result reception means of a monitoring section and a detection result by the air pressure detection means is obtained for each tire in accordance with the ID code. Therefore, because radio waves different for each tire are not used, the structure of equipment is simplified and it is possible to very easily measure the air pressure of a tire. Moreover, a female driver can easily measure the air pressure. Thereby, a driver can usually check the air pressure of a tire and it is possible to decrease the number of accidents caused by an abnormal pressure of a tire. Moreover, because detection results are held by storage means, it is possible to easily monitor the air pressure of a tire while a vehicle stops due to a stop signal even if air pressure detection means is used which cannot detect the air pressure of a tire unless a wheel rotates. Furthermore, because detection results are transferred by radio waves, troublesome wiring is unnecessary for setting. Furthermore, an ID code different for each tire and a detection result of the air pressure of a tire are transmitted. Therefore, when a plurality of tires are used, it is possible to recognize the detection result for each tire even if the detection results of these tires are transmitted at random by the detection result transmission means.

According to claim 7, a detection result of the air pressure of a tire detected by air pressure detection means provided at each detection section is transmitted from each detection section together with an ID code by radio waves of the same frequency only when a monitoring instruction is output from a monitoring section. The transmitted radio waves are received by the monitoring section and a detection result is obtained for each tire in accordance with the ID code. Therefore, it is possible to very easily measure the air pressure of a tire and moreover, a female driver can easily measure the air pressure. Thereby, a driver can usually check the air pressure of a tire and it is possible to decrease the number of accidents caused by an abnormal air pressure of a tire. Moreover, because a detection result is transmitted only when a monitoring start instruction is output, it is possible to prevent unnecessary radio waves from being emitted when monitoring of the air pressure of a tire is unnecessary and decrease the power consumption. Furthermore, because detection results are transferred by radio waves, troublesome wiring is unnecessary for setting.

According to claim 8, a detection result of the air pressure of a tire detected by air pressure detection means provided at each detection section is transmitted from each detection section by radio waves of the same frequency together with an ID code only when a monitoring start instruction is output from a monitoring section. The transmitted radio waves are received by detection result reception section of the monitoring section and a detection result is obtained for each tire in accordance with the ID code. Therefore, it is possible to very easily measure the air pressure of a tire and moreover, a female driver can easily measure the air pressure. Thereby, a driver can usually check the air pressure of a tire and it is possible to decrease the number of accidents caused by an abnormal air pressure of a tire. Moreover, because a detection result is transmitted only when a monitoring start instruction is output, it is possible to prevent unnecessary radio waves from being emitted when monitoring of the air pressure of a tire is unnecessary and decrease the power consumption. Furthermore, because detection results are held by storage means, it is possible to easily monitor the air pressure of a tire while a vehicle stops due to a stop signal even if air pressure detection means is used which cannot detect the air pressure of a tire unless a wheel rotates. Furthermore, because detection results are transferred by radio waves, troublesome wiring is unnecessary for setting.

According to claim 9, in addition to the above advantages, a detection result is repeatedly transmitted up to a predetermined number of times by detection result transmission means driven by driving control means. Therefore, even if the detection result cannot preferably be received by detection result reception means due to noises or the like, the detection result can preferably be received at least once out of a plurality of times. Therefore, it is possible to prevent a state which cannot be monitored from occurring and decrease the number of malfunctions.

According to claim 10, in addition to the above advantages, an ID code given to distinguish between tires and different for each tire is transmitted together with a monitoring start instruction by instruction transmission means and an air pressure detection result of a tire corresponding to the ID code is returned. Therefore, even when a plurality of tires are used, it is possible to sequentially designate these tires and return the detection result of the tire. Moreover, it is possible to easily recognize the detection result of each tire even if detection results are transmitted or received by using the same frequency.

According to claim 11, in addition to the above advantages, it is possible to confirm the safety before traveling of a vehicle because the latest air pressure of a tire is monitored when the vehicle starts.

According to claim 12, in addition to the above advantages, it is possible to know the air pressure of a tire when a driver requires it because the latest air pressure of the tire is monitored when a switch is turned on.

According to claim 13, in addition to the above advantages, it is possible to receive a detection result even if a slight frequency fluctuation occurs compared to a case of using frequency modulation because the detection result is transmitted by amplitude-modulating a carrier wave.

According to claim 14, in addition to the above advantages, a driver can easily know the state of the air pressure of a tire because the above detection result obtained by detection result reception means is notified by using, for example, an image, digital display, lighting of a lamp, voice, or combination of them.

BRIEF DESCRIPTION OF THE DRAWINGS

FIGS. 7(a) to 7(d) explain operations for detecting the air pressure of a tire in the first embodiment of the present invention;

FIG. 16 is a block diagram showing the electric circuit of the sixth embodiment of the present invention;

FIG. 17 is a block diagram showing the electric circuit of the seventh embodiment of the present invention; and FIG. 18 is a block diagram showing the electric circuit of the eighth embodiment of the present invention.

BEST MODE FOR CARRYING OUT THE INVENTION

An embodiment of the present invention is described below by referring to the accompanying drawings.

Figure 1:
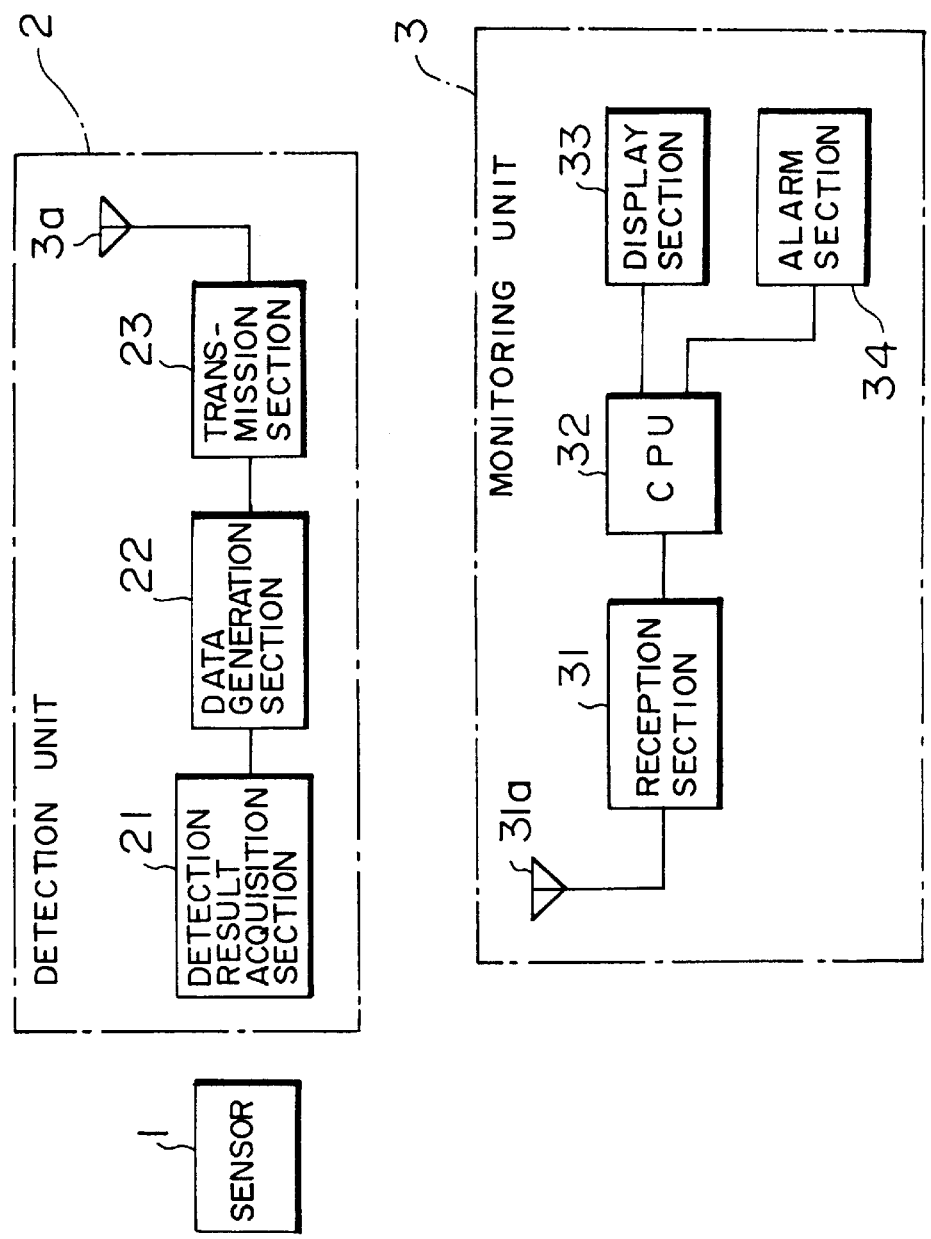
FIG. 1 is a block diagram showing the electric circuit of the first embodiment of the present invention.

FIG. 1 is a block diagram showing the electric circuit of the first embodiment of the present invention. In FIG. 1, symbol 1 represents a sensor for detecting the air pressure of a tire, 2 represents a detection unit for transmitting a detection result of the sensor 1 by radio waves, and 3 represents a monitoring unit for supplying information to a driver by receiving radio waves from the detection unit 2.

Figure 2:
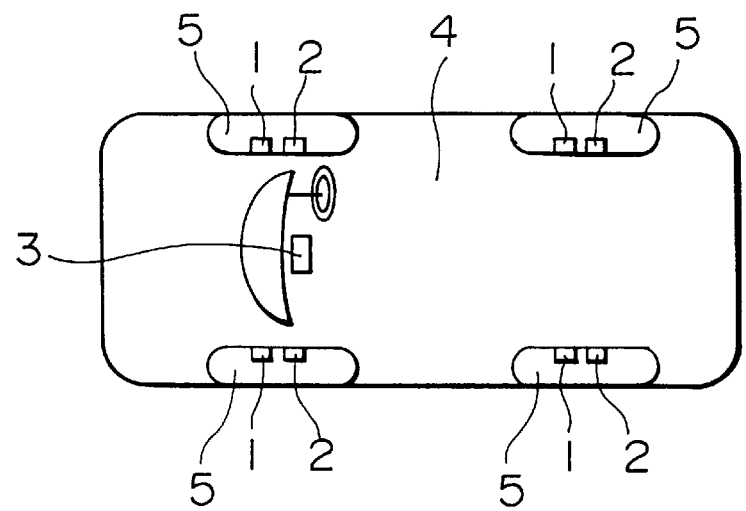
FIG. 2 is an illustration for explaining the locations of a sensor and a detection unit in the first embodiment of the present invention.
Figure 3:
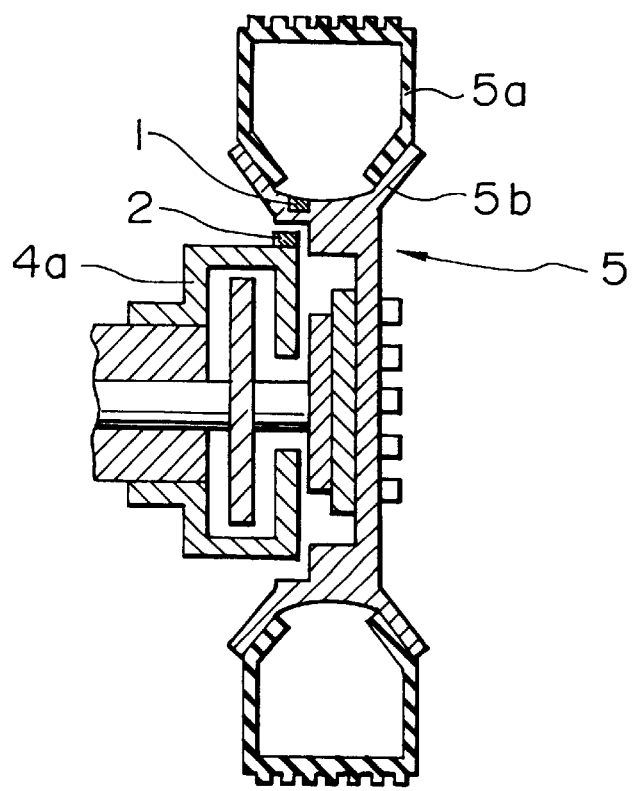
FIG. 3 is an illustration for explaining the locations of a sensor and a detection unit in the first embodiment of the present invention.

The sensor 1 is provided on each wheel assembly 5 of a vehicle 4 to detect the air pressure of a tire 5a as shown in FIGS. 2 and 3.

The detection unit 2, as shown in FIGS. 2 and 3, is provided at the chassis side 4a for each wheel assembly 5 of the vehicle 4 and its location is the inside of the wheel 5b of the wheel assembly 5 and set so as to face the sensor 1. The detection unit 2, as shown in FIGS. 2 and 3, comprises a detection result acquisition section 21 for acquiring a detection result of the air pressure of a tire detected by the sensor 1, a data generation section 22 for inputting a detection result acquired by the detection result acquisition section 21 and generating digital data in which the detection result is added to an ID code different for each preset tire, a transmission section 23 for transmitting the digital data generated by the data generation section 22 by radio waves of a predetermined frequency obtained by modulating carrier waves through AM (amplitude modulation), and a transmission antenna 23a connected to the transmission section 23.

The monitoring unit 3, as shown in FIG. 2, is set nearby a driver's seat so that the unit 3 can be seen from a driver as shown in FIG. 2 and comprises a reception section 31 for receiving radio waves transmitted from the transmission section 23, a reception antennal 31a, a CPU 32 for performing predetermined operations by receiving a detection result and an ID code from the reception section 31 to output a display signal for displaying a detection result of the air pressure of each tire and an alarm signal for notifying a driver of an abnormal air pressure, a display section 33 for displaying a detection result of the air pressure of each tire by receiving a display signal from the CPU 32, and an alarm section 34 for outputting an alarm in accordance with an input alarm signal.

Figure 4:
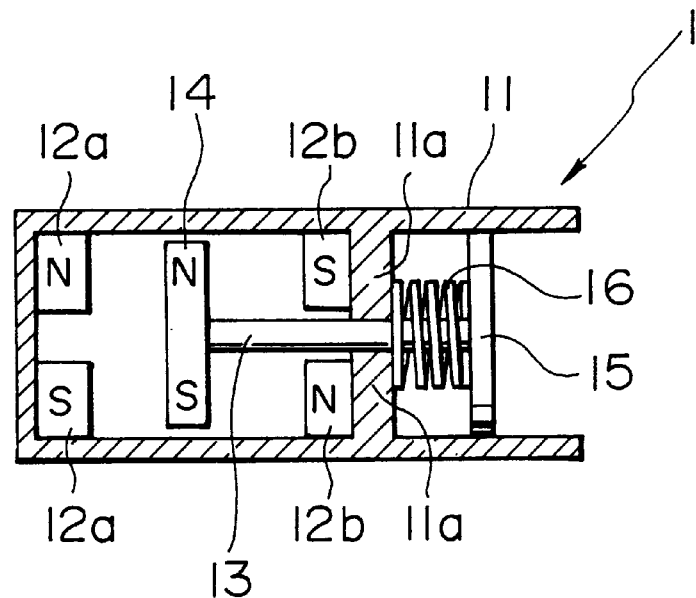
FIG. 4 is a block diagram showing a sensor in the first embodiment of the present invention.
Figure 5:
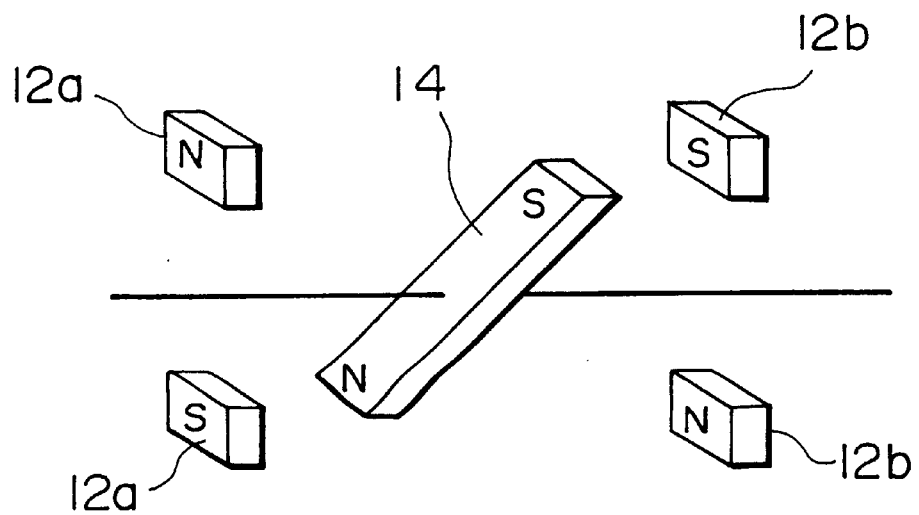
FIG. 5 is an illustration for explaining operations of a sensor in the first embodiment of the present invention.

The sensor 1 uses, for example, a sensor having the structure shown in FIGS. 4 and 5. That is, the sensor 1 comprises two sets of stationary magnets 12a and 12b secured in a frame 11 made of a cylindrical nonmagnetic substance at predetermined intervals, a moving magnet 14 rotatably and slidably supported by one end of a support shaft 13 between the stationary magnets 12a and 12b, a piston 15 secured to the other end of the support shaft 13 and using the frame 11 as a cylinder, and a spring 16 set between a journal section 11a of the frame 11 and the piston 15.

Moreover, the stationary magnets 12a and 12b, moving magnet 14, and spring 16 are arranged in a space closed by the frame 11 and piston 15. Furthermore, one end of the frame 11 serving as the cylinder of the piston 15 is opened so that outside air pressure (air pressure of the tire 5a) works on the piston 15. Furthermore, the stationary magnets 12a and 12b are arranged so that their opposite poles face each other.

Thereby, as shown in FIG. 5, when outside air pressure works on the piston 15 and the support shaft 13 slides, the distances between the moving magnet 14 and the two sets of stationary magnets 12a and 12b change. Therefore, the moving magnet 14 is rotated by the magnetic force between the moving magnet 14 and the stationary magnets 12 and 12b and stops at a position corresponding to the outside air pressure. Therefore, by knowing a magnetic force and its direction vertical to the support shaft 13, it is possible to detect the pressure applied to the piston, that is, the air pressure of the tire 5a.

Figure 6:
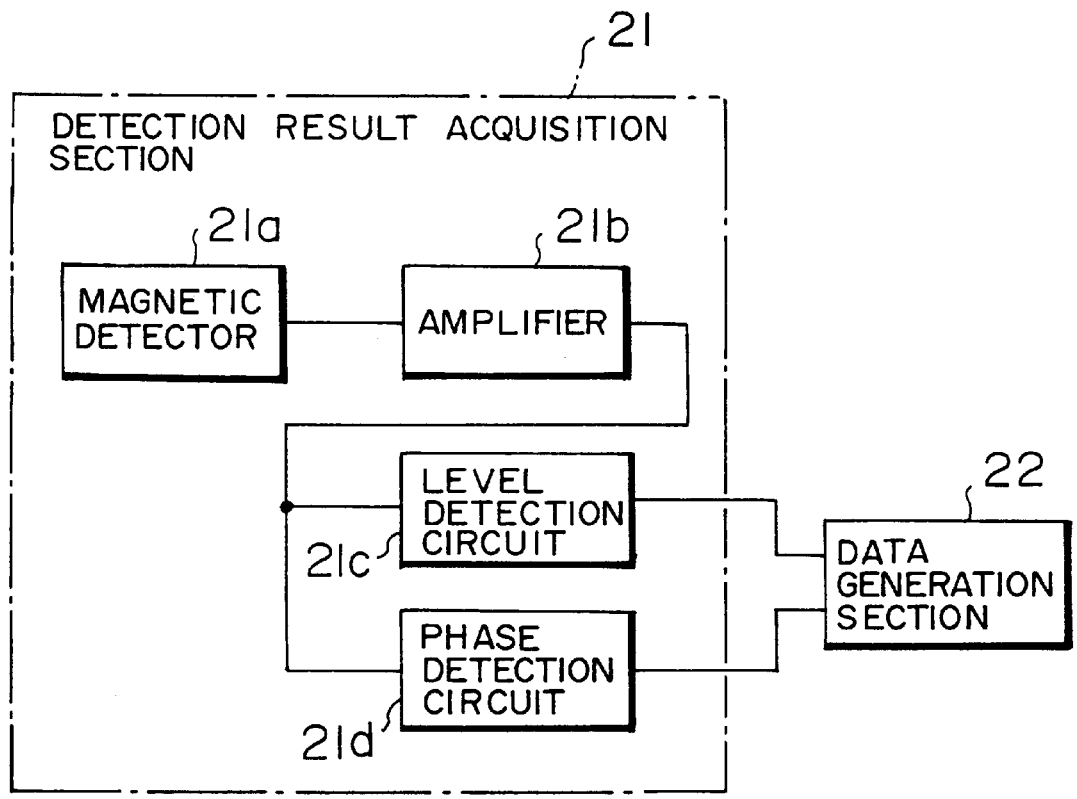
FIG. 6 is a block diagram showing details of a detection result acquisition section in the first embodiment of the present invention.

The detection result acquisition section 21 when using the sensor 1 described above, as shown in FIG. 6, comprises a magnetic detector 21a, an amplifier 21b, a level detection circuit 21c, and a phase detection circuit 21d. The magnetic detector 21a comprises, for example, a coil or the like and generates an electromotive force according to a magnetism received from the sensor 1. In this case, polarities of the electromotive force are changed in accordance with the direction of a magnetic force given from the sensor 1 and moreover, magnitudes (levels) of the electromotive force are changed in accordance with the intensity of the magnetic force. The electromotive force generated by the magnetic detector 21a is amplified by the amplifier 21b and thereafter, input to the level detection circuit 21c and the phase detection circuit 21d. Thereby, a magnitude of the electromotive force is detected by the level detection circuit 21c, a phase of the electromotive force is detected by the phase detection circuit 21d, and the detected magnitude and phase are input to the data generation section 22.

Then, operations of the first embodiment having the above structure are described below.

When the vehicle 4 travels, the wheel assembly 5 rotates, and the sensor 1 passes the vicinity of the detection unit 2, an electromotive force is generated in the magnetic detector 21a by magnetic forces of the magnets 12a, 12b, and 14 in the sensor 1. The electromotive force, as shown in FIG. 7, changes correspondingly to the position of the moving magnet 14 in the sensor 1. Moreover, the position of the moving magnet 14 moves correspondingly to an air pressure P of the tire 5a as described above. Therefore, when the air pressure P changes as P1<P2<P3<P4, the moving magnet 14 rotates, its positions change, and levels and phases of an electromotive force V generated in the magnetic detector 21a change.

Figures 8, 9:
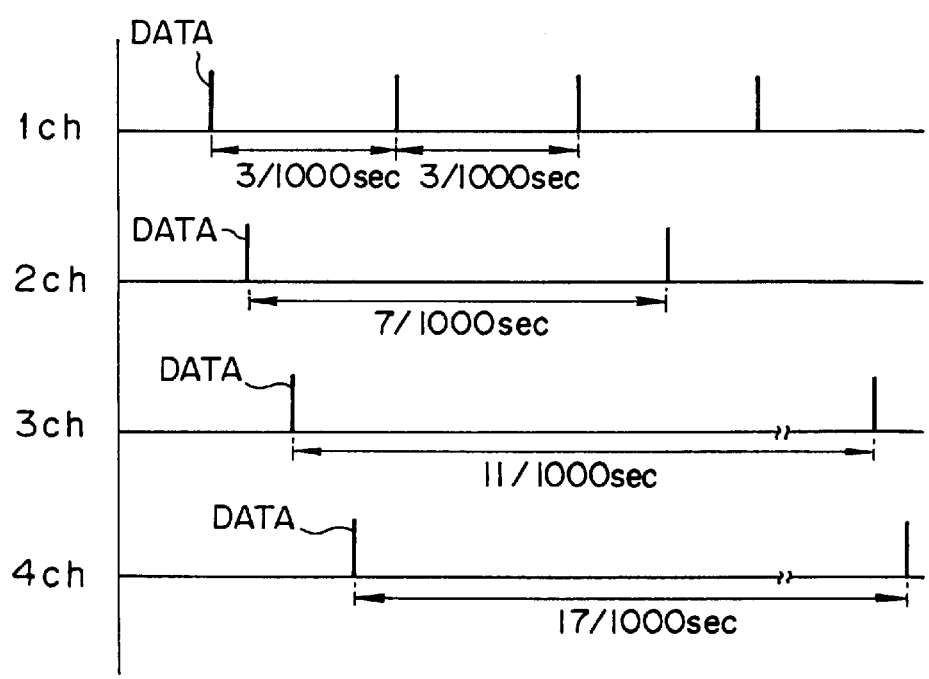
FIG. 8 is an illustration for explaining the relation between detected level and detected value of the air pressure of a tire in the first embodiment of the present invention.
FIG. 9 is an illustration for explaining information transmission timing from a detection unit in the first embodiment of the present invention.

In the case of this embodiment, the electromotive force V is converted from analog to digital values and its level is classified into 4 stages by the level detection circuit 21c. Thereby, the data generation section 22, as shown in FIG. 8, generates detected values of 0 to 7 as the air pressure of the tire 5a by combining the phases and levels of the electromotive force V. Each of these detected values comprises 3 bits in terms of digital data. Moreover, in the data generation section 22, an ID code comprising 24 bits is added to a 3-bit detected value. The ID code is previously set to a memory in the data generation section 22 so as to differ for each tire 5a (detection unit 2). The 27-bit digital data generated in the data generation section 22 is sent to the transmission section 23.

When digital data is sent from the data generation section 22, the transmission section 23 transmits the digital data by radio waves of a predetermined frequency such as radio waves of the frequency specified by the feeble radio wave equipment standard in the Radio Law. In this case, the digital data is transmitted through the so-called AM waves obtained by amplitude-modulating carrier waves. The AM waves have an advantage that digital data can securely be received even if a slight frequency fluctuation occurs compared to FM waves (frequency modulated waves). Moreover, data is transmitted from each detection unit 2 by using the same frequency.

Furthermore, in the case of transmission, transmission for 1/1000 sec is repeated 15 times every 5 sec. Furthermore, the above 15-time repetitive transmission is performed by the detection unit 2 corresponding to each tire at a different cycle respectively. In the case of a four-wheel vehicle, for example, when assuming that transmission channels of the detection unit 2 corresponding to each tire use channels 1 to 4, as shown in FIG. 9, the detection unit 2 using the channel 1 performs the above 15-time repetitive transmission at 3/1000-sec intervals and each of the detection units 2 using the channels 2 to 4 performs the above 15-time repetitive transmission every 7/1000, 11/1000, and 17/1000 sec.

Therefore, by making the repetition interval different every transmission channel of each detection unit 2, it is possible to decrease the rate of overlap of transmission waves of channels. Moreover, it is possible to further decrease the above overlap rate by setting the repetition interval to a value of different odd-number times of 1/100 sec every detection unit 2.

Thereby, it is possible to securely distinguish between signals from a plurality of detection units 2 even if the same frequency is used.

A detection result (27-bit digital data) transmitted from each detection unit 2 is received by the reception section 31 of the monitoring unit 3 and input to the CPU 32 as, for example, TTL-level digital data.

The CPU 32 classifies a detection result sent from each detection unit 2 in accordance with an ID code and converts a 3-bit detected value into a display signal to output it to the display section 33. Moreover, the CPU outputs an alarm signal to the alarm section 34 when the detected value comes to a predetermined reference value or less.

Figure 10:
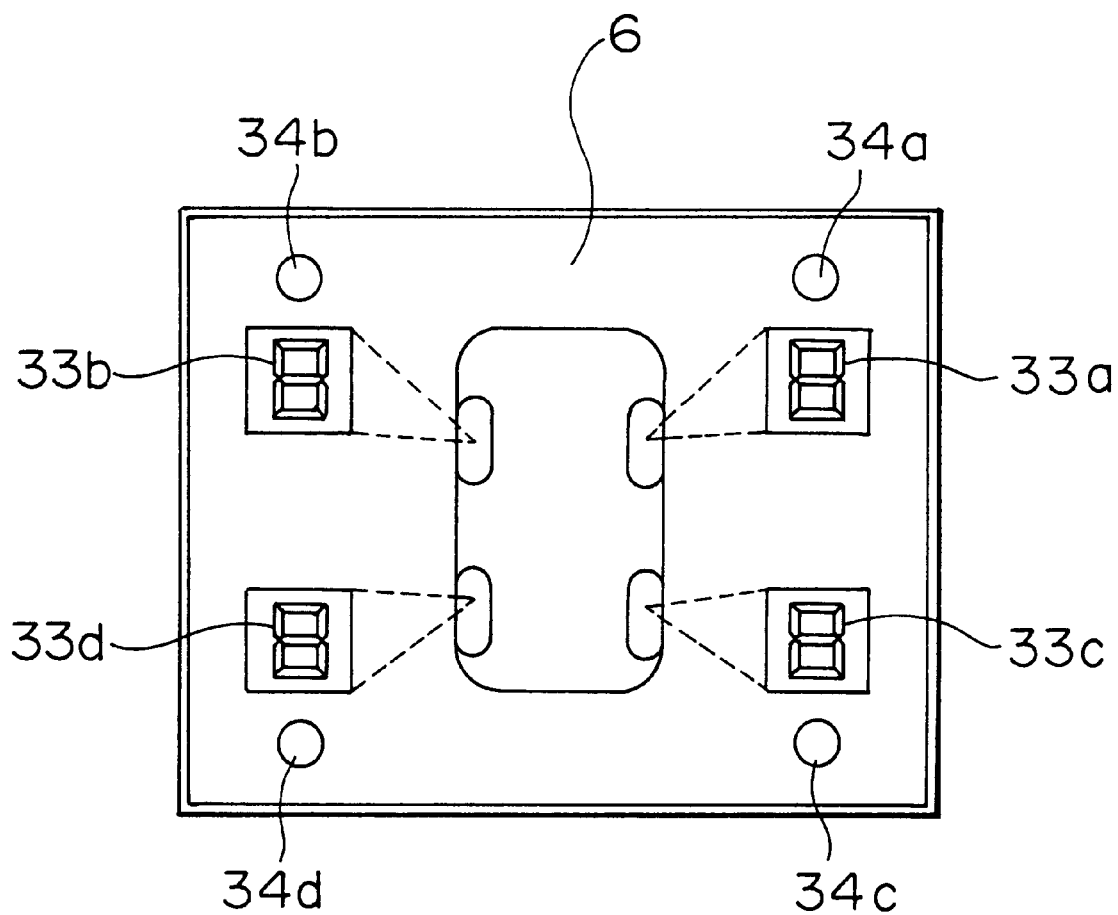
FIG. 10 is an illustration showing a monitoring panel in the first embodiment of the present invention.

The display section 33 is provided with four 7-segment LED numeral indicators (hereafter numeral indicators) 33a to 33d arranged correspondingly to wheel assemblies on the monitoring panel 6 shown in FIG. 10 and the alarm section 34 is provided with four red LEDs 34a to 34d arranged correspondingly to wheel assemblies on the monitoring panel 6 and a not-illustrated buzzer.

Thereby, the display section 33 displays the above detected value on the numeral indicators 33a to 33d in accordance with a display signal input from the CPU 32. Moreover, the alarm section 34 flickers the red LEDs 34a to 34d and sounds a buzzer (not illustrated) in accordance with an alarm signal input from the CPU 32.

As described above, the first embodiment makes it possible to very easily measure the air pressure of a tire and moreover allows a female driver to easily measure the air pressure because the air pressure of the tire 5a is detected by the sensor 1 provided at the wheel assembly 5 side and the detection unit 2 provided at the chassis side, the detection result is received by the monitoring unit 3 through radio waves, and the detection result of the air pressure of the tire is monitored.

Thereby, a driver can usually check the air pressure of a tire and it is possible to decrease the number of accidents caused by an abnormal pressure of a tire. Moreover, because only the sensor 1 is provided at the wheel assembly side and the detection unit 2 and the monitoring unit 3 are provided at the chassis side, it is possible to relatively easily set these units. Furthermore, because detection results are transferred by radio waves, troublesome wiring is unnecessary for setting.

Then, the second embodiment of the present invention is described below.

Figure 11:
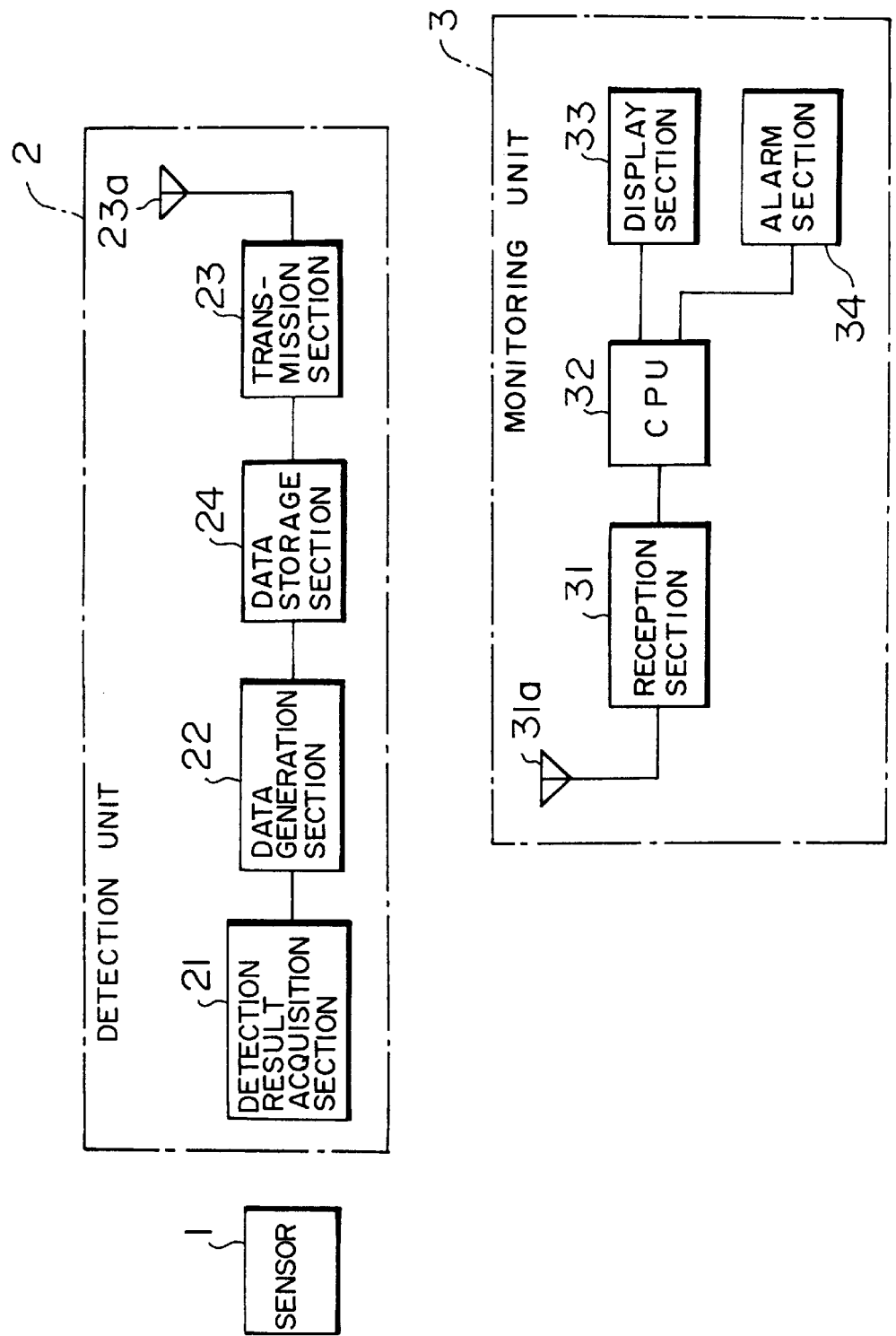
FIG. 11 is a block diagram showing the electric circuit of the second embodiment of the present invention.

FIG. 11 is a block diagram showing the electric circuit of the second embodiment. In FIG. 11, a component portion same as that of the above first embodiment is provided with the same symbol and its description is omitted. The second embodiment is different from the first embodiment in that a data storage section 24 is set between the data generation section 22 and the transmission section 23.

Thereby, 27-bit digital data generated by the data generation section 22 is temporarily stored in the data storage section 24 and then, transmitted by the transmission section 23.

Therefore, it is possible to optionally set a transmission cycle in the case of the second embodiment though digital data is transmitted at the timing of acquiring a detection result from the sensor 1 and generating digital data in the case of the first embodiment.

Moreover, in the case of the first embodiment, because the wheel assembly 5 does not rotate while a vehicle is stopped due to a stop signal and therefore, a detection result by the sensor 1 cannot be acquired by the detection result acquisition section 21, no detection result is transmitted from the detection unit 2. However, the second embodiment makes it possible to transmit the latest detection result and monitor the result even while a vehicle stops.

Then, the third embodiment of the present invention is described below.

Figure 12:
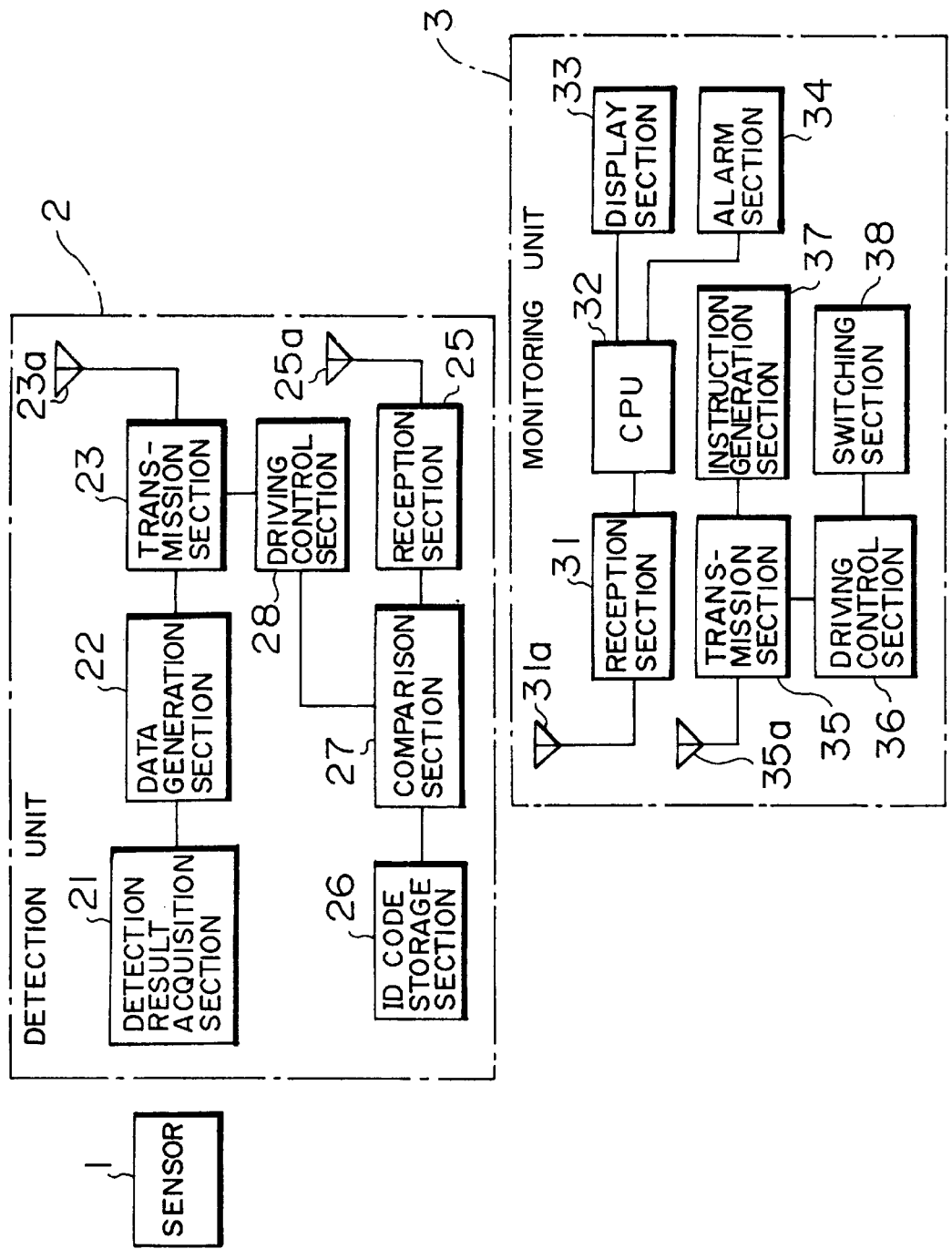
FIG. 12 is a block diagram showing the electric circuit of the third embodiment of the present invention.

FIG. 12 is a block diagram showing an electric circuit of the third embodiment. In FIG. 12, a component portion same as that of the first embodiment is provided with the same symbol and its description is omitted. The third embodiment is different from the first embodiment in that a detection result is transmitted from the detection unit 2 when a monitoring start instruction is output from the monitoring unit 3.

That is, in the case of the third embodiment, the detection unit is further provided with a reception unit 25, a reception antenna 25a, an ID code storage section 26, a comparison section 27, and a driving control section 28 and moreover, the monitoring unit 3 is further provided with a transmission section 35, a transmission antenna 35a, a driving control section 36, an instruction generation section 37, and a switching section 38 in addition to the structure of the first embodiment.

In this case, the switching section 38 is provided with a momentary switch interlocking with a key switch for starting a vehicle and a momentary switch set to the above-described monitoring panel 6.

Thereby, in the monitoring unit 3, the transmission section 35 is driven by the driving control section 36 when a vehicle starts and the switch set to the monitoring panel 6 is turned on and a monitoring start instruction generated by the instruction generation section 37 is transmitted. In this case, the instruction generation section 37 generates digital data to which an ID code for designating one detection unit 2 for a command representing a monitoring start instruction is added and the digital data is transmitted from the transmission section 35 as a monitoring start instruction. Moreover, the monitoring start instruction is generated correspondingly to four wheel assemblies 5 of a vehicle and successively transmitted to four detection units 2.

In the detection unit 2, an ID code previously assigned to it's self is stored in the ID code storage section 26. When the reception section 25 receives a monitoring start instruction, the ID code included in the received monitoring start instruction is compared with the ID code stored in the ID code storage section 26 by the comparison section 27. As the result of this comparison, when the two ID codes coincide each other, a coincidence signal is output from the comparison section 27 to the driving control section 28. The driving control section 28 drives the transmission section 23 only for a predetermined time after receiving the coincidence signal. Thereby, a detection result of the air pressure of a tire is transmitted while the transmission section 23 is driven.

In this case, even if the data generation section 22 generates digital data in which no ID code is added to a detected value, the monitoring unit 3 is able to decide from which detection unit 2 a detection result is received.

The above described third embodiment makes it possible to prevent unnecessary radio waves from being emitted when monitoring of the air pressure of a tire is unnecessary and decrease the power consumption because a detection result is transmitted from the detection unit 2 only when a monitoring start instruction is output from the monitoring unit 3.

Moreover, because the latest air pressure of a tire is monitored when a vehicle starts, it is possible to confirm the safety before traveling of the vehicle.

Then, the fourth embodiment of the present invention is described below.

Figure 13:
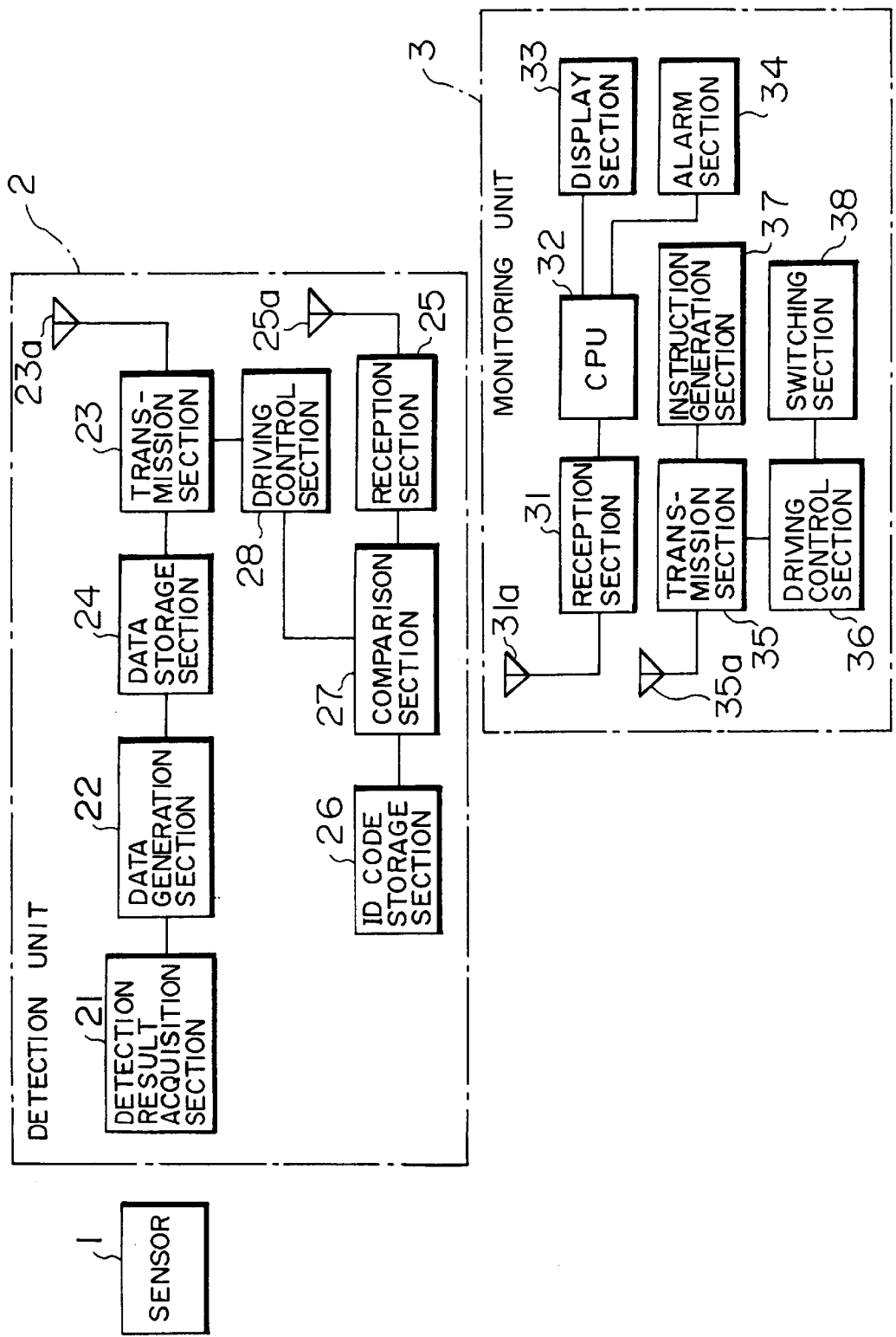
FIG. 13 is a block diagram showing the electric circuit of the fourth embodiment of the present invention.

FIG. 13 is a block diagram showing the electric circuit of the fourth embodiment. In FIG. 13, a component portion same as that of the above described second embodiment is provided with the same symbol and its description is omitted. The fourth embodiment is different from the second embodiment in that a detection result is transmitted from the detection unit 2 when a monitoring start instruction is output from the monitoring unit 3 similarly to the case of the third embodiment.

That is, in the case of the fourth embodiment, the detection unit 2 is provided with the reception section 25, the reception antenna 25a, the ID code storage section 26, the comparison section 27, and the driving control section 28 and moreover, the monitoring unit 3 is provided with the transmission section 35, the transmission antenna 35a, the driving control section 36, the instruction generation section 37, and the switching section 38 similarly to the case of the third embodiment in addition to the structure of the second embodiment.

Thereby, in the monitoring unit 3, the transmission section 35 is driven by the driving control section 36 when a switch set to the switching section 38 is turned on and a monitoring start instruction generated by the instruction generation section 37 is transmitted. In this case, the instruction generation section 37 generates digital data to which an ID code for designating one detection unit 2 for a command representing a monitoring start instruction is added and the digital data is transmitted from the transmission section 35 as a monitoring start instruction. Moreover, the monitoring start instruction is generated correspondingly to four wheel assemblies 5 of a vehicle and successively transmitted to four detection units 2.

In the detection unit 2, an ID code previously assigned to it's self is stored in the ID code storage section 26. When the reception section 25 receives a monitoring start instruction, the ID code included in the received monitoring start instruction is compared with the ID code stored in the ID code storage section 26 by the comparison section 27. As the result of this comparison, when the two ID codes coincide each other, a coincidence signal is output from the comparison section 27 to the driving control section 28. The driving control section 28 drives the transmission section 23 only for a predetermined time after receiving the coincidence signal. Thereby, a detection result of the air pressure of a tire is repeatedly transmitted at predetermined intervals while the transmission section 23 is driven. Therefore, the monitoring unit 3 is able to securely receive a detection result even if there are noises because the unit 3 can repeatedly consecutively receive the same data transmitted from one detection unit 2.

The above described fourth embodiment makes it possible to prevent unnecessary radio waves from being emitted when monitoring the air pressure of a tire is unnecessary and decrease the power consumption because a detection result is transmitted from the detection unit 2 only when a monitoring start instruction is output from the monitoring unit 3.

Moreover, when comparing the fourth embodiment with the third embodiment, the fourth embodiment makes it possible to transmit the latest detection result even while a vehicle stops and monitor the result because the detection result is stored in the data storage section 34 though no detection result is transmitted from the detection unit 2 in the case of the third embodiment because the wheel assembly 5 does not rotate while a vehicle stops due to a stop signal and thereby, the detection result acquisition section 21 cannot acquire a detection result by the sensor 1.

Then, the fifth embodiment of the present invention is described below.

Figure 14:
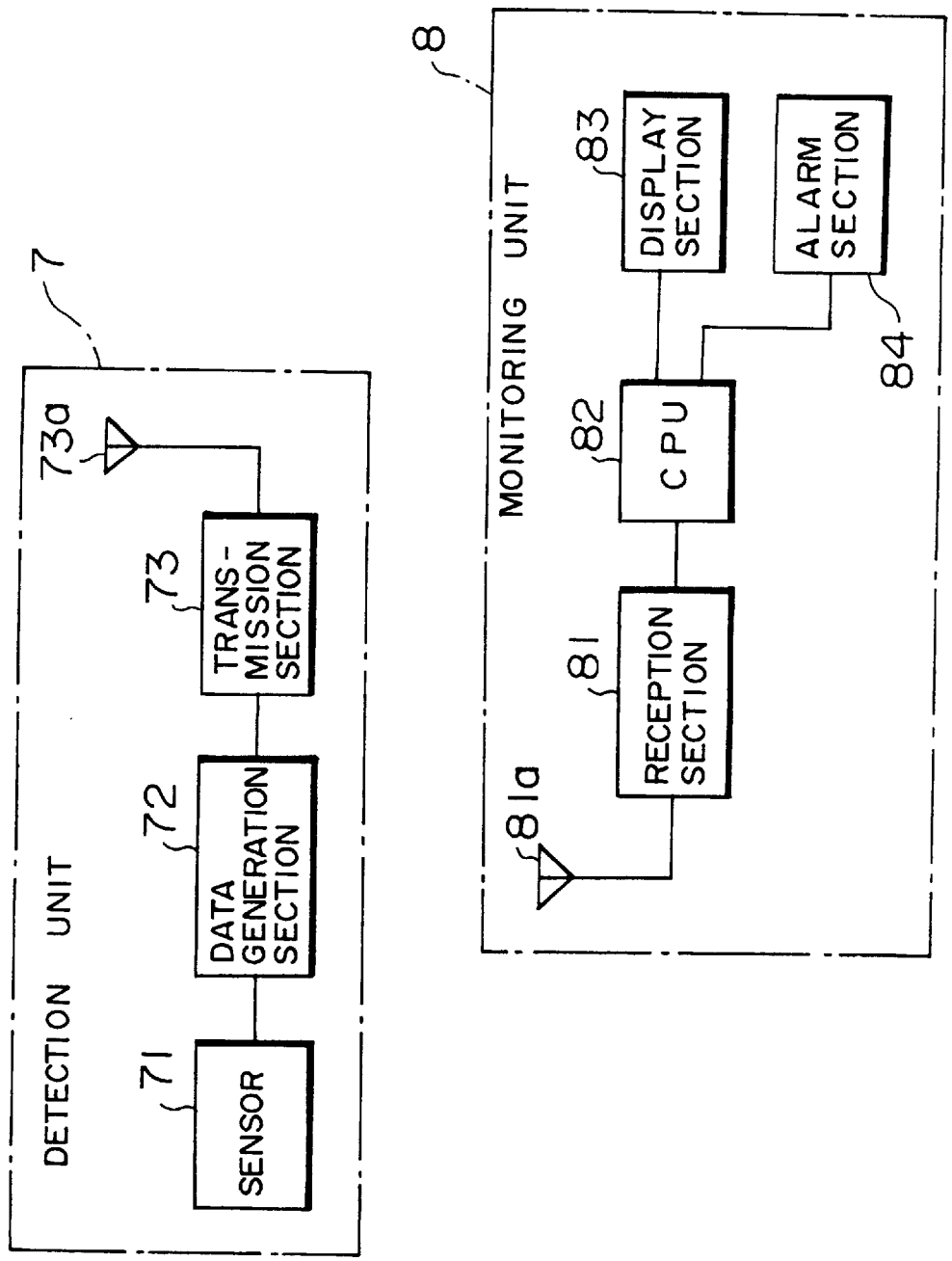
FIG. 14 is a block diagram showing the electric circuit of the fifth embodiment of the present invention.

FIG. 14 is a block diagram showing the electric circuit of the fifth embodiment. In FIG. 14, symbol 7 represents a detection unit set to each wheel assembly and 8 represents a monitoring unit set nearby the driver's seat so that it can be seen from a driver.

The detection unit 7 comprises a sensor 71 for detecting the air pressure of a tire, a data generation section 72 for generating digital data obtained by adding a detection result of the air pressure of a tire detected by the sensor 71 to a preset ID code different for each tire by inputting the detection result, a transmission section 73 for transmitting the digital data generated by the data generation section 72 by radio waves of a predetermined frequency obtained by modulating carrier waves through AM (amplitude modulation), and a transmission antenna 73a.

The sensor 71 can use a sensor different from those used for the first to fourth embodiments, that is, a sensor for detecting pressure and converting the pressure to an electric signal. For example, it is possible to use a force-balance-type pressure sensor, capacitance-type pressure sensor, semiconductor pressure sensor, or piezoelectric pressure sensor which is known to the public.

The data generation section 72 inputs a detected signal output from the sensor 71, converts the signal from analog to digital values to generate 3-bit detected values of 0 to 7 similarly to the case of the first embodiment, and generates digital data in which an ID code of 24 bits is added to the 3-bit detected values. The ID code is previously set to a memory in the data generation section 72 so as to differ for each tire 5a (detection unit 2). The 27-bit digital data generated by the data generation section 72 is sent to the transmission section 73.

The transmission section 73 transmits the digital data at the timing of receiving the digital data from the data generation section 72. In this case, the digital data is transmitted by radio waves of a predetermined frequency such as radio waves of the frequency specified by the feeble radio wave equipment standard in the Radio Law.

Moreover, this embodiment transmits digital data by the so-called AM waves obtained by amplitude-modulating carrier waves. An AM wave has an advantage that digital data can securely be received if a slight frequency fluctuation occurs, compared to an FM wave (frequency modulated wave). Moreover, data is transmitted from each detection unit 7 by using the same frequency.

Furthermore, in the case of transmission, transmission for 1/1000 sec is repeated 15 times every 5 sec. Furthermore, as described above, the above 15-time repetitive transmission is performed by the detection unit 7 corresponding to each tire at a different cycle respectively. In the case of a four-wheel vehicle, for example, when assuming that transmission channels of the detection unit 7 corresponding to each tire use channels 1 to 4, as shown in FIG. 9, the detection unit 7 using the channel 1 performs the above 15-time repetitive transmission at 3/1000-sec intervals and each of the detection units 7 using the channels 2 to 4 performs the above 15-time repetitive transmission every 7/1000, 11/1000, and 17/1000 sec.

Therefore, by making the repetition interval different every transmission channel of each detection unit 7, it is possible to decrease the rate of overlap of transmission waves of channels. Moreover, it is possible to further decrease the above overlap rate by setting the repetition interval to a value of different odd-number times of 1/100 sec every detection unit 7.

Thereby, it is possible to securely distinguish between signals from a plurality of detection units 7 even if the same frequency is used.

Moreover, the monitoring unit 8 comprises a reception section 81 for receiving radio waves transmitted from the transmission section 73, a reception antenna 81a, a CPU 82 for performing predetermined operations by inputting a detection result and an ID code received by the reception section 81 and outputting a display signal for displaying a detection result of the air pressure of each tire and an alarm signal for notifying a driver of an abnormal air pressure, a display section 83 for displaying a detection result of the air pressure of each tire by receiving a display signal from the CPU 82, and an alarm section 84 for outputting an alarm in accordance with an input alarm signal.

Figure 15:
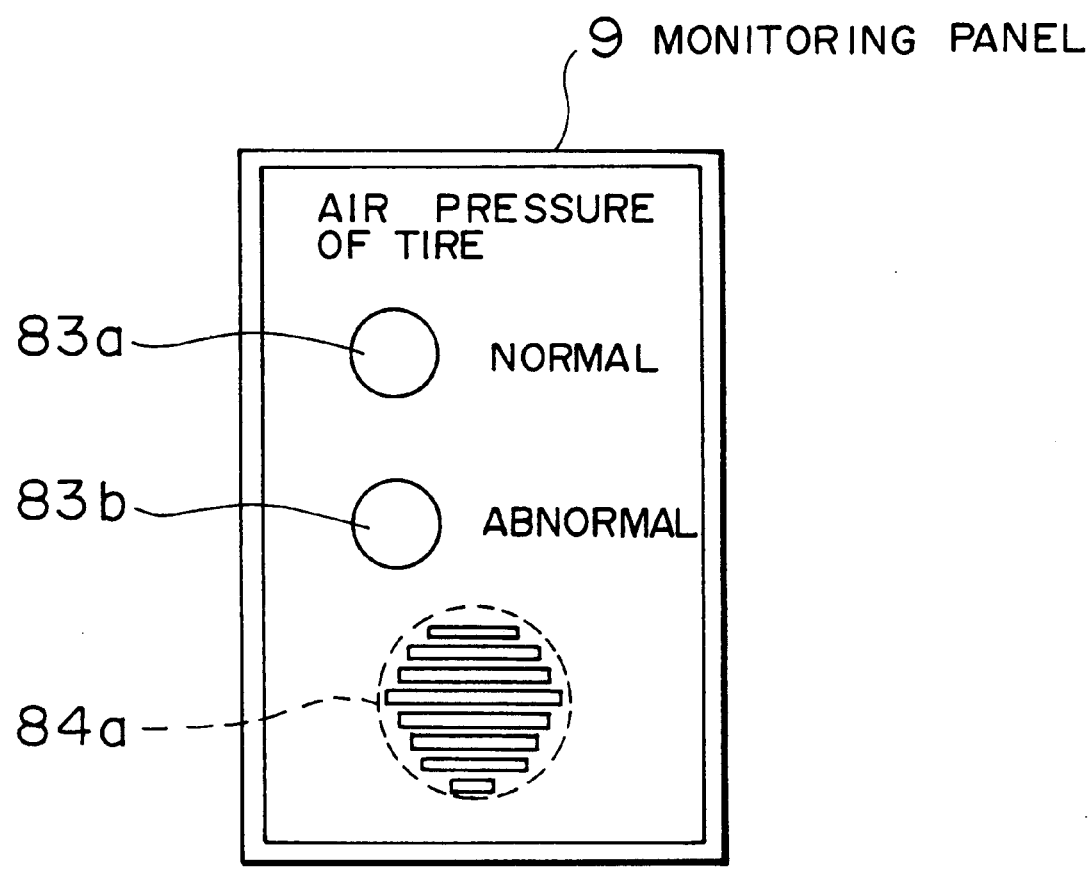
FIG. 15 is an illustration showing a monitoring panel in the fifth embodiment of the present invention.

The display section 83 is provided with a green LED 83a and a red LED 83b arranged on a monitoring panel 9 shown in FIG. 15 and the alarm section 84 is provided with a buzzer 84a.

Then, operations of the fifth embodiment having the above-described structure are described below.

The air pressure of a tire of the wheel assembly 5 is always detected by the sensor 71, a detected signal output from the sensor 71 is converted from analog to digital values by the data generation section 72, 3-bit detected values of 0 to 7 are generated similarly to the case of the first embodiment, and digital data in which an ID code of 24 bits is added to the 3-bit detected values is generated.

The ID code is previously set to a memory in the data generation section 72 so as to differ for each tire 5a (detection unit 2). The 27-bit digital data generated by the data generation section 72 is sent to the transmission section 73 and transmitted at a predetermined cycle.

A detection result (27-bit digital data) transmitted from each detection unit 7 is received by the reception section 81 of the monitoring unit 8 and input to the CPU 82 as, for example, TTL-level digital data.

The CPU 82 classifies the detection result sent from each detection unit 7 in accordance with an ID code and compares each 3-bit detected value with a predetermined reference value. As the result of this comparison, when every detected value is equal to or more than the reference value, the CPU 82 outputs a normal display signal showing that the air pressure of a tire is normal to the display section 83. However, when any detected value is less than the reference value, the CPU 82 outputs an abnormal display signal showing that the air pressure of a tire is abnormal to the display section 83 and moreover, outputs an alarm signal to the alarm section 84.

Thereby, the display section 33 turns on the green LED 83a when receiving a normal display signal from the CPU 32 and flickers the red LED 83b when receiving an abnormal display signal. Moreover, the alarm section 34 sounds the buzzer 84a when receiving an alarm signal from the CPU 32.

As described above, the fifth embodiment makes it possible to very easily measure the air pressure of a tire and also allows a female driver to easily measure the air pressure because the air pressure of the tire 5a is detected by the detection unit 7 set to the wheel assembly 5 side and the detection result is received by the monitoring unit 8 through radio waves and monitored.

Thereby, a driver can usually check the air pressure of a tire and it is possible to decrease the number of accidents caused by an abnormal air pressure of a tire.

Moreover, because detection results are transferred by radio waves, troublesome wiring is unnecessary for setting.

Then, the sixth embodiment of the present invention is described below.

FIG. 16 is a block diagram showing the electric circuit of the sixth embodiment. In FIG. 16, a component portion same as that of the above fifth embodiment is provided with the same symbol and its description is omitted. Moreover, the sixth embodiment is different from the fifth embodiment in that a data storage section 74 is provided between the data generation section 72 and the transmission section 73 in the detection unit 7.

Thereby, 27-bit digital data generated by the data generation section 72 is temporarily stored in the data storage section 74 and then transmitted by the transmission section 73.

Therefore, though a detection result from the sensor 71 is acquired and digital data is transmitted at the timing of generating the digital data in the case of the fifth embodiment, the sixth embodiment makes it possible to optionally set a transmission cycle.

Then, the seventh embodiment of the present invention is described below.

FIG. 17 is a block diagram showing the electric circuit of the seventh embodiment. In FIG. 17, a component portion same as that of the above-described fifth embodiment is provided with the same symbol and its description is omitted. The seventh embodiment is different from the fifth embodiment in that a detection result is transmitted from the detection unit 7 when a monitoring start instruction is output from the monitoring unit 8.

That is, in the case of the seventh embodiment, the detection unit 7 is provided with a reception section 75, a reception antenna 75a, an ID code storage section 76, a comparison section 77, and a driving control section 78 and moreover, the monitoring unit 8 is provided with a transmission section 85, a transmission antenna 85a, a driving control section 86, an instruction generation section 87, and a switching section 88 in addition to the structure of the fifth embodiment.

In this case, the switching section 88 is provided with a momentary switch interlocking with a key switch for starting a vehicle and a momentary switch set to the monitoring panel 9.

Thereby, in the monitoring unit 8, the transmission section 85 is driven by the driving control section 86 when a vehicle starts and the switch set to the monitoring panel 9 is turned on and a monitoring start instruction generated by the instruction generation section 87 is transmitted. In this case, the instruction generation section 87 generates digital data to which an ID code for designating one detection unit 7 for a command representing a monitoring start instruction is added and the digital data is transmitted from the transmission section 85 as a monitoring start instruction. Moreover, the monitoring start instruction is generated correspondingly to four wheel assemblies 5 of a vehicle and successively transmitted to four detection units 7.

In the detection unit 7, an ID code previously assigned to it's self is stored in the ID code storage section 76. When the reception section 75 receives a monitoring start instruction, the ID code included in the received monitoring start instruction is compared with the ID code stored in the ID code storage section 76 by the comparison section 77. As the result of this comparison, when the two ID codes coincide each other, a coincidence signal is output from the comparison section 77 to the driving control section 78. The driving control section 78 drives the transmission section 73 only for a predetermined time after receiving the coincidence signal. Thereby, a detection result of the air pressure of a tire is transmitted while the transmission section 73 is driven.

In this case, even if the data generation section 72 generates digital data in which no ID code is added to a detected value, the monitoring unit 8 is able to decide from which detection unit 7 a detection result is received.

The above described seventh embodiment makes it possible to prevent unnecessary radio waves from being emitted when monitoring of the air pressure of a tire is unnecessary and decrease the power consumption because a detection result is transmitted from the detection unit 7 only when a monitoring start instruction is output from the monitoring unit 8.

Then, the eighth embodiment of the present invention is described below.

FIG. 18 is a block diagram showing the electric circuit of the eighth embodiment. In FIG. 18, a component portion same as that of the sixth embodiment is provided with the same symbol and its description is omitted. The eighth embodiment is different from the sixth embodiment in that a detection result is transmitted from the detection unit 7 when a monitoring start instruction is output from the monitoring unit 8 similarly to the case of the above described seventh embodiment.

That is, in the case of the eighth embodiment, the detection unit 7 is provided with the reception section 75, the reception antenna 75a, the ID code storage section 76, the comparison section 77, and the driving control section 78 and moreover, the monitoring unit 8 is provided with the transmission section 85, the transmission antenna 85*a*, the driving control section 86, the instruction generation section 87, and the switching section 88 similarly to the case of the seventh embodiment in addition to the structure of the sixth embodiment.

Thereby, in the monitoring unit 8, the transmission section 85 is driven by the driving control section 86 when a switch set to the switching section 88 is turned on and a monitoring start instruction generated by the instruction generation section 87 is transmitted. In this case, the instruction generation section 87 generates digital data to which an ID code for designating one detection unit 7 for a command representing an monitoring start instruction is added and the digital data is transmitted from the transmission section 85 as a monitoring start instruction. Moreover, the monitoring start instruction is generated correspondingly to four wheel assemblies 5 of a vehicle and successively transmitted to four detection units 7.

In the detection unit 7, an ID code previously assigned to it's self is stored in the ID code storage section 76. When the reception section 75 receives a monitoring start instruction, the ID code included in the received monitoring start instruction is compared with the ID code stored in the ID code storage section 76 by the comparison section 77. As the result of this comparison, when the two ID codes coincide each other, a coincidence signal is output from the comparison section 77 to the driving control section 78. The driving control section 78 drives the transmission section 73 only for a predetermined time after receiving the coincidence signal. Thereby, a detection result of the air pressure of a tire is repeatedly transmitted at predetermined intervals while the transmission section 73 is driven. Therefore, because the monitoring unit 8 is able to repeatedly and consecutively receive the same data transmitted from one detection unit 7, it is possible to securely receive the detection result even if there are noises.

The above described eighth embodiment makes it possible to prevent unnecessary radio waves from being emitted when monitoring of the air pressure of a tire is unnecessary and decrease the power consumption because a detection result is transmitted from the detection unit 7 only when a monitoring start instruction is output from the monitoring unit 8.

Though a detection result of the air pressure of a tire is expressed by detected values of eight stages in the case of the above first to eighth embodiments, the expression method is not restricted to the above.

Moreover, in the case of the above first to eighth embodiments, the notification method of a detection result uses a 7-segment numeral indicator, LED, and buzzer. However, it is also possible to notify a driver of a detection result of the air pressure of a tire by using voices, images, or combination of them.

Furthermore, in the case of the above first to eighth embodiments, the sensor 1 or detection unit 7 is set to the wheel 5*b* of the wheel assembly 5. However, it is also possible to set the sensor 1 or detection unit 7 to the tire 5*a*.

I claim:

1. A vehicle tire air pressure monitor for monitoring the air pressure of a tire of a wheel assembly provided on a vehicle, comprising:

air pressure detection means for detecting the air pressure of a tire provided at each wheel assembly side; a plurality of detection sections provided at the chassis side for each air pressure detection means to transmit signals by radio waves of the same frequency; and a monitoring section for receiving signals by the radio waves of said frequency; wherein said detection section is provided with detection result acquisition means for acquiring a detection result by said air pressure detection means and detection result transmission means for transmitting said detection result acquired by said detection result acquisition means together with an ID code given to distinguish between tires and different for each tire by using radio waves obtained by amplitude-modulating carrier waves of a predetermined frequency, and said monitoring section is provided with detection-result reception means for receiving the radio waves transmitted from said detection result transmission means and obtaining a detection result for said each tire in accordance with said ID code.

2. A vehicle tire air pressure monitor for monitoring the air pressure of a tire of a wheel assembly provided on a vehicle, comprising:

air pressure detection means for detecting the air pressure of a tire provided at each wheel assembly side;

a plurality of detection sections provided at the chassis side for each air pressure detection means to transmit signals by radio waves of the same frequency; and a monitoring section for receiving signals by the radio waves of said frequency; wherein said detection section is provided with detection result acquisition means for acquiring a detection result by said air pressure detection means, storage means for storing said detection result acquired by said detection result acquisition means for a predetermined time, and detection result transmission means for transmitting the detection result stored in said storage means together with an ID code given to distinguish between tires and different for each tire by using radio waves obtained by amplitude-modulating carrier waves of a predetermined frequency, and said monitoring section is provided with detection result reception means for receiving radio waves transmitted from said detection result transmission means and obtaining a detection result for said each tire in accordance with said ID code.

3. A vehicle tire air pressure monitor for monitoring the air pressure of a tire of a wheel assembly provided on a vehicle, comprising:

air pressure detection means for detecting the air pressure of a tire provided at each wheel assembly side;

a plurality of detection sections provided at the chassis side for each air pressure detection means to transmit signals by radio waves of the same frequency; and a monitoring section for receiving signals by the radio waves of said frequency; wherein said detection section is provided with detection result acquisition means for acquiring a detection result by said air pressure detection means, detection result transmission means for repeatedly transmitting said detection result acquired by said detection result acquisition means up to a predetermined number of times together with an ID code given to distinguish between tires and different for each tire by using radio waves obtained by amplitude-modulating carrier waves of a predetermined frequency, instruction reception means for receiving a monitoring start instruction transmitted from said instruction transmission means, and driving control means for driving said detection result transmission means when receiving said monitoring start instruction by said instruction reception means, and said monitoring section is provided with detection result reception means for receiving the radio waves transmitted from said detection result transmission means and obtaining a detection result for said each tire in accordance with said ID code, instruction transmission means for transmitting said monitoring start instruction by radio waves obtained by amplitude-modulating carrier waves of a predetermined frequency.

4. A vehicle tire air pressure monitor for monitoring the air pressure of a tire of a wheel assembly provided on a vehicle, comprising:

air pressure detection means for detecting the air pressure of a tire provided at each wheel assembly side;

a plurality of detection sections provided at the chassis side for each air pressure detection means to transmit signals by radio waves of the same frequency; and a monitoring section for receiving signals by the radio waves of said frequency; wherein said detection section is provided with detection result acquisition means for acquiring a detection result by said air pressure detection means, storage means for storing said detection result acquired by said detection result acquisition means for a predetermined time, detection result transmission means for repeatedly transmitting the detection result stored in said storage means up to a predetermined number of times together with an ID code given to distinguish between tires and different for each tire by using radio waves obtained by amplitude-modulating carrier waves of a predetermined frequency, instruction reception means for receiving a monitoring start instruction, and driving control means for driving said detection result transmission means when receiving said monitoring start instruction by said instruction reception means, and said monitoring section is provided with detection result reception means for receiving the radio waves transmitted from said detection result transmission means and obtaining a detection result for said each tire in accordance with said ID code and instruction transmission means for transmitting said monitoring start instruction by radio waves obtained by amplitude-modulating carrier waves of a predetermined frequency.

5. A vehicle tire air pressure monitor for monitoring the air pressure of a tire of a wheel assembly provided on a vehicle, comprising:

a plurality of detection sections provided at the wheel assembly side for each tire to transmit signals by radio waves of the same frequency; and a monitoring section for receiving the signals by the radio waves of said frequency; wherein said detection section is provided with air pressure detection means for detecting the air pressure of a tire, detection result acquisition means for acquiring a detection result by said air pressure detection means, and detection result transmission means for transmitting the detection result acquired by said detection result acquisition means together with an ID code given to distinguish between tires and different for each tire by using radio waves obtained by amplitude-modulating carrier waves of a predetermined frequency, and said monitoring section is provided with detection result reception means for receiving the radio waves transmitted from said detection result transmission means and obtaining a detection result for said each tire in accordance with said ID code.

6. A vehicle tire air pressure monitor for monitoring the air pressure of a tire of a wheel assembly provided on a vehicle, comprising:

a plurality of detection sections provided at the wheel assembly side for each tire to transmit signals by radio waves of the same frequency; and a monitoring section for receiving the signals by the radio waves of said frequency; wherein said detection section is provided with air pressure detection means for detecting the air pressure of a tire, detection result acquisition means for acquiring a detection result by said air pressure detection means, storage means for storing said detection result acquired by said detection result acquisition means for a predetermined time, and detection result transmission means for transmitting the detection result stored in said storage means together with given to distinguish between tires and different for each tire by using radio waves obtained by amplitude-modulating carrier waves of a predetermined frequency, and said monitoring section is provided with detection result reception means for receiving the radio waves transmitted from said detection result transmission means and obtaining a detection result for said each tire in accordance with said ID code.

7. A vehicle tire air pressure monitor for monitoring the air pressure of a tire of a wheel assembly provided on a vehicle, comprising:

a plurality of detection sections provided at each wheel assembly side to transmit signals by radio waves of the same frequency; and a monitoring section provided at the chassis side; wherein said detection section is provided with air pressure detection means for detecting the air pressure of a tire, detection result transmission means for repeatedly transmitting a detection result by said air pressure detection means up to a predetermined number of times together with an ID code given to distinguish between tires and different for each tire by using radio waves obtained by amplitude-modulating carrier waves of a predetermined frequency, instruction reception means for receiving a monitoring start instruction sent by radio waves of a predetermined frequency, and driving control means for driving said detection result transmission means when receiving said monitoring start instruction by said instruction reception means, and said monitoring section is provided with instruction transmission means for transmitting said monitoring start instruction by radio waves obtained by amplitude-modulating carrier waves of a predetermined frequency and detection result reception means for receiving the radio waves transmitted from said detection result transmission mean and obtaining a detection result for said each tire.

8. A vehicle tire air pressure monitor for monitoring the air pressure of a tire of a wheel assembly provided on a vehicle, comprising:

a plurality of detection sections provided at each wheel assembly side to transmit signals by radio waves of the same frequency; and a monitoring section provided at the chassis side; wherein said detection section is provided with air pressure detection means for detecting the air pressure of a tire, storage means for storing a detection result by said air pressure detection means for a predetermined time, detection result transmission means for repeatedly transmitting a detection result by said air pressure detection means up to a predetermined number of times together with an ID code given to distinguish between tires and different for each tire by using radio waves obtained by amplitude-modulating carrier waves of a predetermined frequency, instruction-reception means for receiving a monitoring start instruction sent by radio waves of a predetermined frequency, and driving control means for driving said detection result transmission means when receiving said monitoring start Instruction by said instruction reception means, and said monitoring section is provided with instruction transmission means for transmitting said monitoring start instruction by radio waves obtained by amplitude-modulating carrier waves of a predetermined frequency and detection result reception means for receiving the radio waves transmitted from said detection result transmission means and obtaining a detection result for said each tire in accordance with said ID code.

9. The vehicle tire air pressure monitor according to any one of claims 3, 4, 7 or 8, wherein said instruction transmission means transmits an ID code given to distinguish between tires and different for each tire together with a monitoring start instruction and said driving control means has ID code storage means for storing the ID code of a tire to be transmitted by detection result transmission means driving-controlled by the driving control means and drives said detection result transmission means when receiving a monitoring start instruction together with the ID code stored in said ID code storage means.

10. The vehicle tire air pressure monitor according to any one of claims 3, 4, 7 or 8, wherein said instruction transmission means transmits said monitoring start instruction when a vehicle starts.

11. The vehicle tire air pressure monitor according to any one of claims 3, 4, 7 or 8, wherein said instruction transmission means has a switch which can be operated by a driver or the like and transmits said monitoring start instruction when said switch is turned on.

12. The vehicle tire air pressure monitor according to any one of claims 1 to 8, wherein notification means is included which notifies a driver of said detection result obtained by said detection result reception means.

* * * * *